Oct. 28, 1952　　　E. H. HICKLING ET AL　　　2,615,514
DOOR FOR VEHICLES
Filed June 1, 1950　　　　　　　　　　　2 SHEETS—SHEET 1
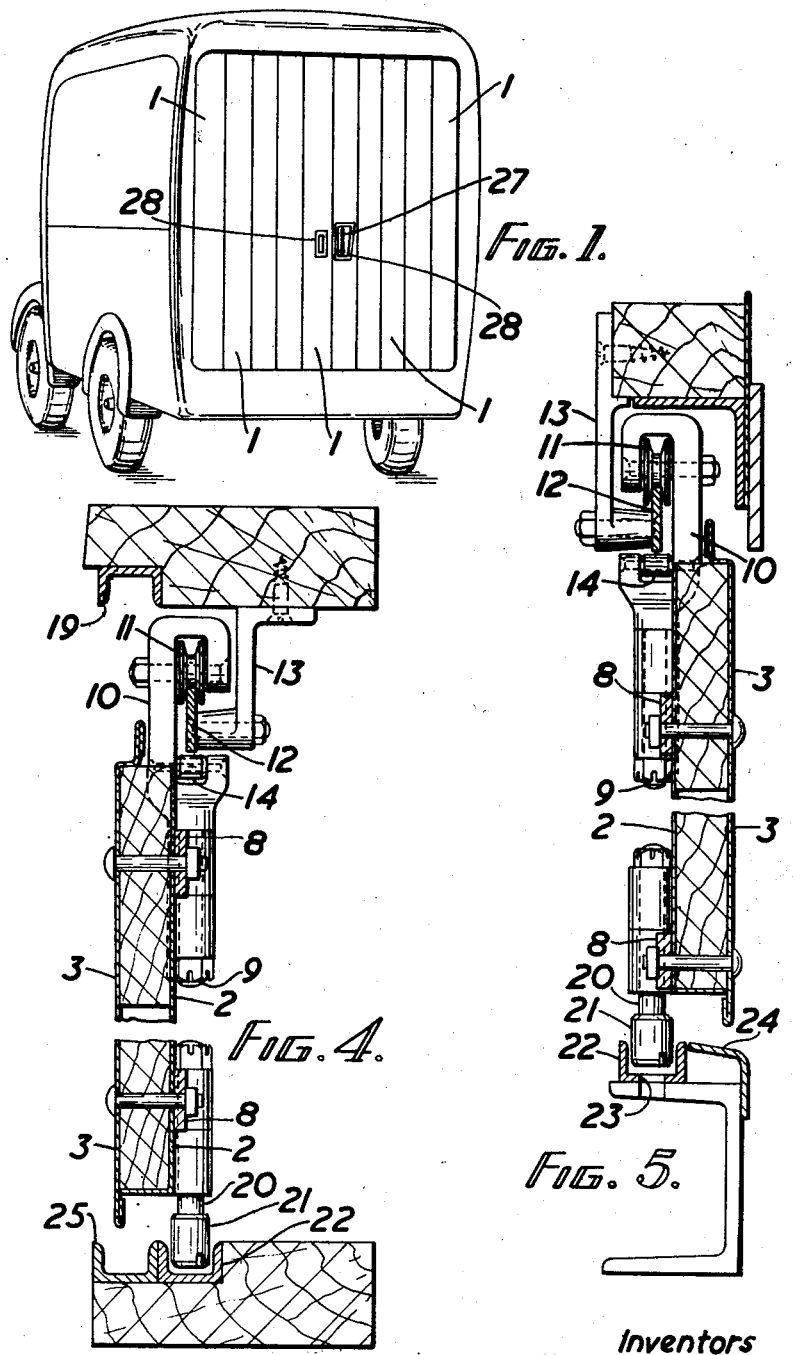
Inventors
ERNEST H. HICKLING
FRANK CHEFFINGS
WILLIAM BUTLIN
By *Frederick E. Hahn*
　　　　Attorney Oct. 28, 1952     E. H. HICKLING ET AL     2,615,514
DOOR FOR VEHICLES
Filed June 1, 1950     2 SHEETS—SHEET 2
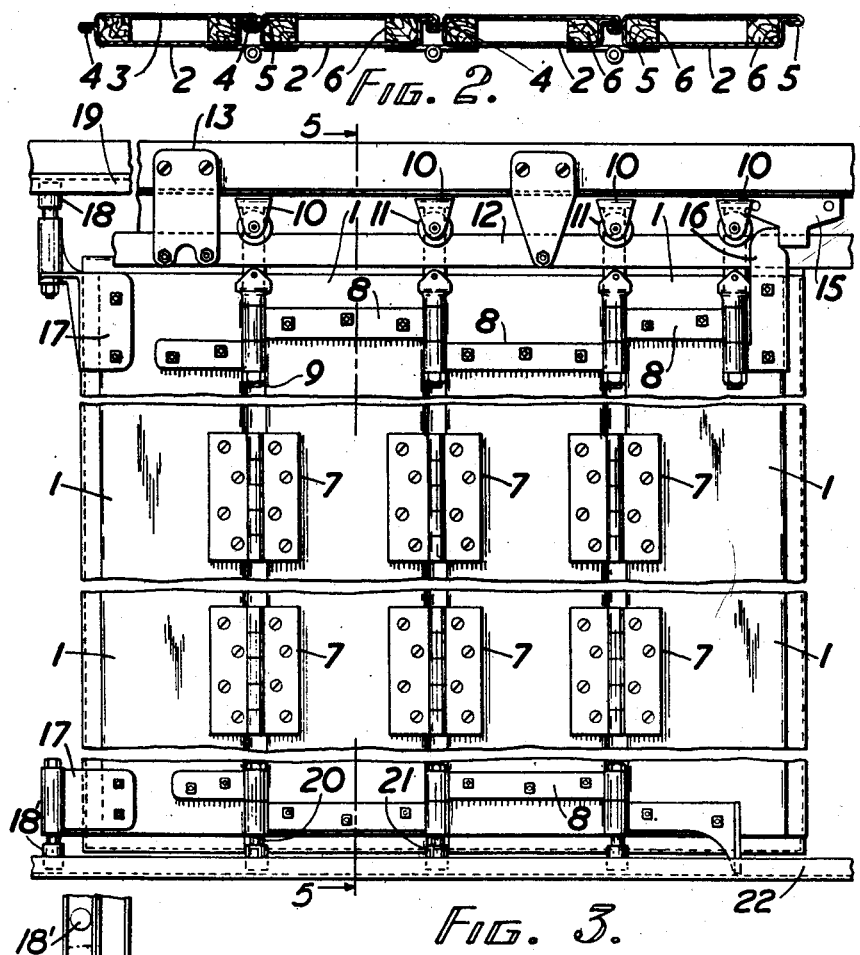
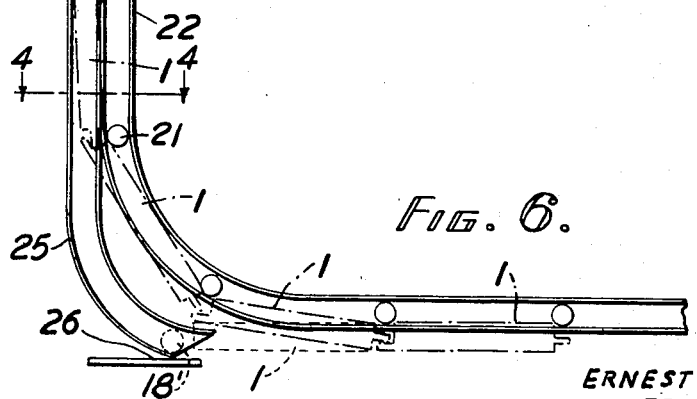
Inventors
ERNEST H. HICKLING
FRANK CHEFFINGS
WILLIAM BUTLIN
By
Attorney Patented Oct. 28, 1952

2,615,514

UNITED STATES PATENT OFFICE 2,615,514

DOOR FOR VEHICLES

Ernest H. Hickling, London, and Frank Cheffings and William Butlin, Greenford, England, assignors to Normand Limited, London, England, a British company Application June 1, 1950, Serial No. 165,464
In Great Britain March 13, 1950

5 Claims. (Cl. 160—118)

This invention relates to doors for vehicles and more particularly to sliding doors for closing the open sides or rear end of a delivery van or similar vehicle. The main object of the invention is to provide an improved and simplified form of sliding door construction in which the door can be moved either to the fully open position leaving the opening clear and unobstructed or to any intermediate position without projecting outside the vehicle body, and which furthermore is efficient and reliable in operation. The invention may be said to represent an alternative arrangement for supporting and guiding a sliding door of the kind disclosed in our co-pending application for United States Letters Patent Ser. No. 99,154 filed on June 15, 1949 now issued as Patent 2,604,162

According to the present invention a vehicle door comprises a plurality of vertical slats hingedly connected along their adjacent vertical edges and slidably suspended at their upper ends from a fixed track extending past the door opening and within at least part of the adjacent vehicle body wall, the lower ends of the slats being located by a fixed guide, including means for preventing upward displacement of the door relative to the track.

The accompanying drawings illustrate by way of example the improved door construction including a pair of sliding doors fitted for the purpose of opening and closing the rear opening in the body of a delivery van.

In these drawings:

Figure 1 is a general view from the rear of the delivery van showing the doors closed.

Figure 2 is an enlarged horizontal section through a door showing the construction of its component slats.

Figure 3 is an interior view of the doors looking rearwardly of the van.

Figure 4 is a sectional view through a door at the side of the van body taken on line 4—4 of Fig. 6.

Figure 5 is a sectional view through a door at the rear of the van body taken on line 5—5 of Fig. 3.

Figure 6 is a plan view of the bottom door guide.

Referring firstly to Figures 1 and 2 of the drawings each sliding door is composed of a number of slats or sections 1 in the manner of a shutter. Each of these slats is formed by a hollow box section of aluminium alloy or other sheet metal measuring some five inches in width and one inch in thickness and extending substantially the full height of the door opening. Each slat is built up from an inwardly facing channel section strip 2 and a substantially flat outer or rearwardly facing strip 3 whose side margins are folded back over outwardly projecting flanges 4 on the channel section strip 2. The two side faces of the channel section strip 2 are of unequal depth and the flat rearwardly facing strip 3 is cranked at one side so that in the complete slat the projecting flange 4 on one side is set back from the front surface sufficiently to allow it to lie behind the flange 5 on the opposite side of the adjacent slat. The inner and outer strips are separated and strengthened by wooden fillets 6 of approximately square section extending along the edges of the slat between these inner and outer strips.

Referring now to Figures 3 to 6 of the drawings, the adjacent slats are hinged together by piano type hinges measuring conveniently some six inches in length, the hinge plates 7 being secured to the rear faces of the slats by screws which enter the wooden fillets.

At the top of the doors elongated hinge plates 8 are bolted to the inner side of the slats 1 and hinge pins 9 are welded to, or form the lower part of, an inverted V-shaped hanger bracket 10. This hanger bracket carries on a horizontal pivot a V-grooved pulley 11 which runs on top of a track rail 12 of flat section steel measuring some three sixteenths of an inch in thickness and one inch in depth. This rail 12 is supported by a bracket 13 screwed to the vehicle body. Three only of these hanger brackets have in addition a small diameter steel retaining roller 14 rotatable on a horizontal pivot passing through the hanger bracket below the pulley 11 so as to engage the bottom of the track rail 12 thereby ensuring that the door cannot jump upwardly off this rail. The hanger brackets 10 equipped in this manner connect at the front end of the first, second, sixth and seventh slats where seven slats are hinged together to form one of a pair of doors as described. A centre stop 15 is fixed to the track rail in the door opening to limit the closing movement of each door by abutment with an extended portion 16 on the terminal hinge plate. Brackets 17 fixed on the rear surface at the top and bottom of the last slat each carry a vertical spindle projecting upwardly above the level of the track rail and mounted on this spindle is a brass roller 18 which may be five eights of an inch in diameter and fitted with a self-lubricating bush. The upper roller 18 runs in an inverted channel section guide 19 secured to the roof of the body alongside the rear opening and body side wall, whilst the lower roller 18' runs in a channel section guide 25 later to be described.

At the lower end of the junction between adjacent slats each hinge pin 20 projects beyond the slats and carries at its end a brass roller 21 and bush identical with the one described above. These rollers 21 run in a channel section guide 22 secured to the vehicle floor, this guide being formed at intervals with downwardly extending slots 23 through which dirt and the like may drop so as not to foul the rollers. An angle section drainage plate 24 is fitted directly beneath the slats to direct water rearwardly from the van body.

At the door opening only the single bottom guide 22 is fitted and this extends rearwardly and longitudinally alongside the outer channel section guide 25 (Figures 4 and 6) whose rear curved portion is of smaller radius than that of the inner guide 22. As already mentioned, this outer guide 25 is adapted to receive the bottom brass roller 18' on the last slat thus ensuring that when the door is in the closed position the rear surface of the last slat is level with the edge of the adjacent corner pillar 26 of the van body.

Fig. 6 shows the door in partly open position in dash-dotted lines and in its fully closed position in dotted lines.

Fig. 6 also illustrates the positions of the door slats 1 for the aforementioned different positions of the door. As will be observed, in the partly open position of the door, bottom roller 18' has entered the straight portion of guide rail 25. When the door is fully closed roller 18' moves to the curved end of guide rail 25 but never leaves this rail so that the door is substantially flush with the side walls of the van body. The corner pillar carries a weather strip (not shown) which abuts the flange 5 on the end slat when the door is closed. A wooden batten may be placed between the hinge plate and this flange to protect the slat from deformation during the action of closing the door. When the door is fully open the slats lie within the hollow rear portions of the vehicle body, a stop member (not shown) being fixed to the guide track or channel to limit the extent of this inward movement. The doors may be locked in their closed position by means of a handle 27 and finger plates 28 are secured to the first slats, that is the abutting slats of each door to facilitate opening and closing of the doors. Any other convenient arrangement for locking abutting slats of the doors when in their closed position may be adopted.

If desired the hanger brackets or rollers may be secured direct to the top and bottom edges of each slat respectively and this and many other alternative arrangements are possible within the scope of the invention which is not limited to the particular arrangement and construction shown and described above.

What is claimed, is:

1. A sliding door assembly for a vehicle body having a door opening therein, the said assembly comprising in combination a vehicle body having side walls in substantially rectangular arrangement, one of said walls including said door opening, a door structure mounted on said body for sliding between a closed position closing said opening and an open position in which the door is disposed substantially parallel to side wall portions adjacent to the side wall including said door opening, the said door structure being composed of a plurality of elongated slats and a plurality of pairs of hinges each hinge including a hinge pin, one hinge of each pair being disposed above the other between each two adjacent slats for hinging the door slats together, a plurality of hanger brackets substantially of inverted U-shape, each secured to the pin of an upper hinge and protruding from the upper edge of the door structure, a grooved pulley mounted within each hanger bracket rotatable about a horizontal axis, a plurality of substantially cylindrical rollers, each secured to the pin of a lower hinge and protruding from the lower edge of the door structure, the said rollers being mounted for rotation about a vertical axis, a first guide track rail fixedly mounted to the vehicle body along the upper side wall edge defining the door opening and extending beyond the said door opening parallel to side wall portions adjacent to the side wall including the door opening, the said pulleys and the said track being disposed in a spatial relationship in which said pulleys ride upon the upper edge of the track thereby suspending the door structure from the track, a jumper roller secured to at least one of said hinge pins and rotatable about a horizontal axis and disposed below the track closely adjacent thereto and in alignment with the track and the respective pulley for preventing track jumping of the pulleys supporting the door structure, a second guide track substantially in form of an upright U-shape fixedly mounted on the vehicle body parallel to and along the lower edge of the side wall defining the door opening and extending beyond the said opening parallel to side wall portions adjacent to the side wall including the door opening, the second guide track being engaged by said cylindrical rollers, a pair of end rollers secured to the outermost door slat nearest to a side wall when the door is in the closed position, one of said end rollers protruding from the upper edge of the outermost slat and the other from the opposite edge of the said slat, a third guide track substantially of inverted U-shape fixedly secured to the vehicle body parallel to the first guide track and engaged by said upper end roller for guiding the same, and a fourth guide track fixedly secured to the vehicle body substantially parallel to the second guide track and engaged by the lower end roller for guiding the same, the said fourth guide track extending parallel to a side wall portion adjacent to the door opening and ending substantially at the respective edge of the door opening.

2. A door assembly as defined in claim 1, wherein said door structure is composed of two symmetrical sections, each of said sections being arranged to be positioned in the open position of the door structure substantially parallel to side wall portions adjacent to the side wall including the door opening and in the closed position of the door structure to abut against the other with the respective longitudinal edge of the outermost slat opposite to the aforesaid outermost slat.

3. A door assembly as defined in claim 1, wherein the pin of each upper hinge supporting one of said hanger brackets is upwardly directed, and wherein the pin of each lower hinge supporting one of said cylindrical rollers is downwardly directed.

4. A door assembly as defined in claim 1, wherein said third and fourth guide tracks are disposed next adjacent to the respective side wall portions of the vehicle body, and wherein all the said tracks and all the said rollers and pulleys coacting therewith are concealed by side wall portions.

5. A door assembly as defined in claim 1, wherein said second guide track includes drainage openings.

ERNEST H. HICKLING.
FRANK CHEFFINGS.
WILLIAM BUTLIN.

REFERENCES CITED

The following references are of record in the file of this patent:

UNITED STATES PATENTS

| Number | Name | Date |
|---|---|---|
| 845,479 | Randall | Feb. 26, 1907 |
| 1,929,977 | Jacobson | Oct. 10, 1933 |
| 2,142,408 | Phillips | Jan. 3, 1939 |
| 2,252,139 | Schlacter | Aug. 12, 1941 |

FOREIGN PATENTS

| Number | Country | Date |
|---|---|---|
| 396,297 | Great Britain | Aug. 3, 1933 |
| 167,420 | Switzerland | May 1, 1934 |